US008897221B2

(12) United States Patent
Sakoda et al.

(10) Patent No.: US 8,897,221 B2
(45) Date of Patent: Nov. 25, 2014

(54) COMMUNICATION SYSTEM, COMMUNICATION APPARATUS, COMMUNICATION METHOD, AND COMPUTER PROGRAM

(75) Inventors: Kazuyuki Sakoda, Tokyo (JP); Yuichi Morioka, Tokyo (JP)

(73) Assignee: Sony Corporation, Tokyo (JP)

( * ) Notice: Subject to any disclaimer, the term of this patent is extended or adjusted under 35 U.S.C. 154(b) by 291 days.

(21) Appl. No.: 13/318,451

(22) PCT Filed: Apr. 19, 2010

(86) PCT No.: PCT/JP2010/056921
§ 371 (c)(1),
(2), (4) Date: Nov. 1, 2011

(87) PCT Pub. No.: WO2010/128623
PCT Pub. Date: Nov. 11, 2010

(65) Prior Publication Data
US 2012/0051293 A1     Mar. 1, 2012

(30) Foreign Application Priority Data
May 8, 2009   (JP) ................................ P2009-113870

(51) Int. Cl.
H04W 92/00     (2009.01)
H04W 72/04     (2009.01)
H04B 7/06     (2006.01)

(52) U.S. Cl.
CPC ........... *H04B 7/0697* (2013.01); *H04W 72/046* (2013.01)
USPC ....................................................... 370/328

(58) Field of Classification Search
CPC ............ H04B 7/0697; H04B 17/0057; H04W 72/046; H04W 24/00; H04W 52/00; H04W 88/02; H04W 52/0216; H01Q 1/246; H01Q 3/2605
USPC .................................................. 370/328–332
See application file for complete search history.

(56) References Cited

U.S. PATENT DOCUMENTS

| 2003/0036404 | A1* | 2/2003 | Adachi et al. ................. 455/522 |
| 2008/0133790 | A1* | 6/2008 | Sharma et al. ................. 710/30 |
| 2010/0151865 | A1* | 6/2010 | Camp et al. ................... 455/445 |

FOREIGN PATENT DOCUMENTS

| JP | 2003-124878 | 4/2003 |
| JP | 2004-328570 | 11/2004 |
| JP | 2005-197973 | 7/2005 |
| JP | 2005-287008 | 10/2005 |
| JP | 2007-510384 | 4/2007 |
| WO | WO 2005/043830 | 5/2005 |

OTHER PUBLICATIONS

Hiertz, G. et al., "A new MAC Protocol for a wireless multi-hop broadband system beyond IEEE 802.11", Wireless World Research Forum, 9th Meeting in Zurich, Switzerland, Jul. 2003, pp. 1-6.

\* cited by examiner

*Primary Examiner* — Faruk Hamza
*Assistant Examiner* — Jean F Voltaire
(74) *Attorney, Agent, or Firm* — Sherr & Jiang, PLLC

(57) ABSTRACT

Space-division multiple access is optimally realized while avoiding inter-network interference.
Time usage information for transmission sequence units is exchanged among different networks or non-adjacent equipment, and on the basis of this information, a station that initiates a transmission sequence unit disposes the start time of its own transmission sequence unit in a time slot which is not being used by an adjacent network or adjacent equipment. As a result, multiple wireless networks or wireless communication devices are able to utilize a channel by time division even in cases where exclusive placement of frequency channels is difficult, and efficient space-division multiple access can be realized.

19 Claims, 14 Drawing Sheets

COMMUNICATION SYSTEM, COMMUNICATION APPARATUS, COMMUNICATION METHOD, AND COMPUTER PROGRAM

TECHNICAL FIELD

The present invention relates to a communication system, to a communication apparatus and communication method, and to a computer program that apply space-division multiple access (SDMA) in which wireless resources on a spatial axis are shared by a plurality of users. More particularly, the present invention relates to a communication system, to a communication apparatus and communication method, and to a computer program that realize space-division multiple access while avoiding inter-network interference.

BACKGROUND ART

Wireless communication eliminates the burden of wiring work for wired communication of the past, and is additionally catered for usage as a technology that realizes mobile communication. For example, IEEE (The Institute of Electrical and Electronics Engineers) 802.11 may be cited as an established standard regarding wireless LANs (Local Area Networks). IEEE 802.11a/g is already widely prevalent.

With many wireless LAN systems such as IEEE 802.11, an access control protocol based on carrier sense such as CSMA/CA (Carrier Sense Multiple Access with Collision Avoidance) is implemented, with each station being configured to avoid carrier collisions during random channel access. Also, virtual carrier sensing may be cited as a methodology for resolving the hidden terminal problem in wireless communication. The RTS/CTS handshake is a representative example of a signal transmission sequence utilizing virtual carrier sensing.

FIG. 10 illustrates a major frame format used for an RTS/CTS handshake in an IEEE 802.11 system. As illustrated, IEEE 802.11a/b/g frames are all composed of a PLCP (Physical Layer Convergence Protocol) preamble and PLCP header which correspond to a physical header, and a PSDU (PHY Service Data Unit) field which corresponds to a MAC (Media Access Control) frame. Also, FIGS. 11A to 11C illustrate respective PSDU formats for the RTS, CTS/ACK, and DATA frames defined in IEEE 802.11.

At the beginning of a PSDU, a Frame Control field and a Duration field are jointly defined. The Frame Control format is further segmentalized with various information stated therein, such as the frame type or protocol version, a resend indicator, and data path information, for example. In the Duration, a counter value called the NAV (Network Allocation Vector) is set. The counter value is taken to indicate the transmission completion time for a subsequent ACK frame, for example. A frame-receiving station to which the frame is not addressed set a NAV counter value on the basis of information in the Duration, and refrains from transmission operations during a communication sequence unit.

As illustrated in FIG. 11A, in an RTS frame, a Receiver Address (RA) indicating the recipient and a Transmitter Address (TA) indicating the sender are stated after the Duration. Also, as illustrated in FIG. 11B, in a CTS frame and an ACK frame, respective sender addresses (TAs) of an RTS and a DATA frame are copied in the Receiver Address (RA) following the Duration. Also, as illustrated in FIG. 11C, in a DATA frame, a plurality of Address fields Addr 1 to 4 are included following the Duration, and are used in order to specify the sender and recipient stations, etc. Also, net information provided to upper layers is stored in the Frame Body following the Address fields. A FCS (Frame Check Sequence) consisting of a 32-bit CRC (Cyclic Redundancy Check) is appended at the end of all frames. For example, at a recipient station that receives a frame, the FCS is recalculated and checked to determine whether or not it matches the FCS that was sent. In the case where they do not match, that frame is discarded as corrupted. In so doing, only correct MAC frames are recognized and processed.

An exemplary RTS/CTS communication sequence will be explained with reference to FIG. 12. In the figure, there exist four stations STA2, STA0, STA1, and STA3, wherein only adjacent stations are positioned within radio wave range. STA3 is a hidden terminal to STA0, and STA2 is a hidden terminal to STA1. Given such a communication environment, consider circumstances where STA0 wants to transmit information to STA1 using an RTS/CTS handshake.

Upon producing a transmit request at time T0, STA0 monitors the medium state for just a given frame interval DIFS (Distributed Inter Frame Space), and if no transmission signal exists in this space, conducts a random backoff. In the case where no transmission signal exists in this space as well, STA0 obtains an exclusive channel usage transmission opportunity (TXOP), and transmits an RTS frame to STA1 at the time T1. Herein, information indicating that the frame is an RTS is stated in the Frame Control field of the RTS frame, information indicating the amount of time until the transmission transaction related to the frame ends (i.e., the amount of time until the time T8) is stated in the Duration field, the address of the recipient STA1 is stated in the RA field, and the address of the STA0 itself is stated in the TA field.

This RTS frame is also received by STA2, the station adjacent to STA0. STA2 conducts virtual carrier sensing upon recognizing from the Frame Control field that the frame is an RTS frame and also recognizing from the RA field that the frame is not addressed to STA2 itself. In other words, STA2 recognizes that the medium is occupied until the time T8 when the transmission transaction ends, and STA2 enters a transmission-denied state without conducting physical carrier sensing. The work of entering this transmission-denied state is realized by set a NAV counter value on the basis of information stated in the Duration field and refraining from transmission operations until the counter expires, and is also called "setting a NAV".

Meanwhile, STA1, upon receiving an RTS frame in which its own address is stated in the RA, recognizes that the adjacent station STA0 whose address is stated in the TA wants to transmit information to STA1 itself. Then, STA1 replies with a CTS frame at a time T3 after a given frame interval SIFS (Short IFS) has elapsed since the time T2 when reception of the RTS frame ended. Information indicating that the frame is a CTS frame is stated in the PSDU Frame Control field inside this CTS field. Information indicating the amount of time until the transmission transaction related to the frame (i.e., the amount of time until the time T8) is stated in the Duration field. The address of the sender (STA0) that was stated in the TA field of the RTS frame is copied to the RA field.

This CTS frame is also received by STA3, the station adjacent to STA1. STA3 conducts virtual carrier sensing upon recognizing from the Frame Control field that the frame is a CTS frame and also recognizing from the RA field that the frame is not addressed to STA3 itself. In other words, STA3 recognizes that the medium is occupied until the time T8 when the transmission transaction ends, and STA3 enters a transmission-denied state without conducting physical carrier sensing.

Meanwhile, STA0, upon receiving a CTS frame in which its own address is stated in the RA, recognizes that STA1 has acknowledged the initiate transmission request from STA0 itself. Then, STA0 initiates transmission of a DATA frame at a time T5 after a given frame interval SIFS has elapsed since the time T4 when reception of this CTS frame ended.

DATA frame transmission ends at a time T6, and in the case where STA1 is able to decode the frame without error, replies with an ACK frame at a time T7 after a given frame interval SIFS. Then, the transmission transaction for a single packet ends at a time T8 when STA0 finishes receiving this ACK frame.

When the time T8 is reached, the respective hidden terminals STA2 and STA3 drop their NAVs and return to an ordinary transmission state.

According to the RTS/CTS handshake, nearby stations STA2 and STA3 that were able receive at least one of an RTS and a CTS transition to a transmission-denied state. As a result, STA0 and STA1 are able to transmit information from STA0 to STA1 and reply with an ACK from STA1 without being impeded by sudden transmission signals from a nearby station. In other words, by using the RTS/CTS handshake in conjunction with the CSMA/CA control protocol, it may be possible to reduce collision overhead in an overloaded state.

In a conventional wireless LAN system, the CSMA/CA control protocol is not only effective for intra-network interference, but also for inter-network interference. For example, as illustrated in FIG. 13, consider the case there exist two adjacent networks, with one network being composed of STA0 acting as an access point with STA1 and STA2 connected thereto, and the other network being composed of STA4 acting as an access point with STA3 and STA5 connected thereto. With IEEE 802.11, control is conducted so as to not produce unnecessary collisions between nearby stations according to a virtual carrier sensing mechanism like that discussed above. Consequently, even if STA2 and STA3 exist within each other's signal ranges, by setting a NAV STA2 is able to avoid conditions in which STA2 receives interference due to a signal from STA3 while receiving a signal from STA0.

Meanwhile, with the IEEE 802.11a/g standard, orthogonal frequency-division multiplexing (OFDM) is used in the 2.4 GHZ band or the 5 GHz band to support a modulation method that achieves a maximum communication rate (physical layer data rate) of 54 Mbps. Also, with the standard's amendment IEEE 802.11n, MIMO (Multi-Input Multi-Output) communication methods are adopted to realize high throughput (HT) exceeding 100 Mbps. Herein, MIMO is a communication method that realizes spatially multiplexed streams by providing a plurality of antenna elements at both the transmitter end and the receiver end (as is commonly known).

For example, by increasing the number of antennas on a MIMO communication device to increase the number of spatially multiplexed streams, throughput for 1-to-1 communication can be improved while maintaining backwards compatibility. Improvements in per-user throughput for communication as well as in throughput for multiple users overall is being demanded for the future.

The IEEE 802.11ac Working Group is attempting to formulate a wireless LAN standard whose data transfer rate exceeds 1 Gbps by using the frequency band below 6 GHz. For its realization, space-division multiple access methods whereby wireless resources on a spatial axis are shared by a plurality of users, such as multi-user MIMO (MU-MIMO) or SDMA (Space-Division Multiple Access), are effective.

With a space-division multiple access system, it is possible to spatially separate multiple user signals received contemporaneously by conducting signal processing that multiplies the outgoing/incoming signals of the plurality of antenna elements by wait values. It also becomes possible to contemporaneously distribute a plurality of signals to multiple users by multiplying signals by similar wait values and then transmitting.

When starting operation of space-division multiple access with a new wireless LAN standard, it is necessary to give due consideration to backwards compatibility with the old standard, since it will be necessary to operate in a communication environment where communication devices of the new standard and communication devices of the old standard. In the legacy IEEE 802.11 standard, carrier sensing mechanisms such as CSMA/CA and RTS/CTS were adopted. Consequently, in a new standard such as IEEE 802.11ac, it is necessary to optimally combine carrier sensing and space-division multiple access.

For example, there has been proposed a communication system that combines the two technologies of carrier sensing in the legacy IEEE 802.11 standard and space-division multiple access with an adaptive array antenna by using RTS, CTS, and ACK frames in a frame format that maintains backwards compatibility with the legacy 802.11 standard (see PTL 1, for example).

FIG. 14 illustrates an exemplary transmission sequence using an RTS/CTS handshake in a space-division multiple access system. In the example illustrated, there exist three stations STA0, STA1, and STA2, and it is assumed that STA0 transmits data contemporaneously to STA1 and STA2.

STA0 conducts physical carrier sensing in advance and confirms that the medium is clear, and after additionally conducting a backoff, sends an RTS frame which indicates that STA0 will transmit information to STA1 and STA2 by space-division multiple access. However, the format of the RTS frame used at this point is not necessarily limited to that illustrated in FIG. 11A. Also, a term different from RTS may be determined by the standard.

In response to receiving an RTS frame, STA1 and STA2 contemporaneously transmit respective CTS frames (CTS-1, CTS2) in order to indicate that they are in a state able to receive information. However, the CTS frames used at this point are not necessarily that illustrated in FIG. 11B, and are assumed to be in a format enabling STA0 to separate the two signals. Also, a term different from CTS may be determined by the standard.

STA0, on the basis of the incoming signals of the received CTS-1 and CTS-2, multiplies these signals by a wait value for each antenna element required for spatial separation (i.e., conducts antenna coefficient learning), thereby separating and receiving the two signals. Additionally, STA0 uses this wait value to contemporaneously transmit DATA frames (DATA-1, DATA-2) to STA1 and STA2. DATA-1 and DATA-2 are frames transmitted by signals that are sent while taking into account the wait coefficients of the antennas such that interference does not occur at their destinations. STA1 is able to receive DATA-1, while STA2 is able to receive DATA-2.

Once STA1 and STA1 finish receiving their respective DATA frames, they contemporaneously reply with ACK frames (ACK-1, ACK-2). STA0 then receives these ACK frames, thereby ending a sequence for transmitting data to multiple stations using space-division multiple access.

Although an exemplary sequence for transmitting information by utilizing the RTS/CTS handshake is illustrated in FIG. 14, contemporaneous data delivery by space-division multiple access may also be applied to frame exchange sequences besides the above. However, since the principal matter of the present invention is not directly related to which communication sequence is used, further explanation thereof will not be given in this specification.

With a wireless LAN system of the past, inter-network interference can be avoided by a CSMA/CA control protocol as discussed above. With 1-to-1 communication, time management for securing a station's band may be comparatively loose. In contrast, with a system to which space-division multiple access has been applied, it is necessary to secure a band for all stations to be multiplexed, which demands more strictness in time management.

Hereinafter, the problem of inter-network interference in a space-division multiple access system will be examined in detail.

Assuming the transmission sequence illustrated in FIG. 14, it becomes necessary for STA0 to contemporaneously transmit data to the plurality of peers STA1 and STA2. In other words, it is necessary for STA0 to secure a state such that transmission can occur with both destinations STA1 and STA2 at the timing when transmission of a plurality of DATA frames (DATA-1, DATA-2) is initiated.

For example, in the case of assuming a station placement wherein a plurality of networks overlap as illustrated in FIG. 13, conditions are expected wherein STA0's transmission sequence and STA4's transmission sequence overlap in time and interference occurs between STA2 and STA3. At this point, in the case where STA2 has set a NAV due to receiving a CTS frame from STA3, STA2 will be unable to reply to an RTS frame addressed to STA2 itself from STA0. As a result, information is not transmitted from STA0 to STA2, and waste occurs. In contrast, assuming the case where a NAV is not set even though STA2 has received a CTS frame from STA3, an outgoing signal from STA2 will interfere with data reception at STA3, and waste will similarly occur.

Consequently, in the case where it is desired to efficiently operate a space-division multiple access system in which parts of wireless networks are placed within radio wave range of each other such that their stations interfere with each other as illustrated in FIG. 13, it is preferable to arrange transmission sequence units for each network so as to not overlap in time, as illustrated in FIG. 16, for example.

Also, FIG. 17 illustrates another exemplary station arrangement in which a plurality of networks overlap. In the example illustrated, there is a network having an access point STA0 with STA 1 and STA2 being connected thereto as terminals (client devices), and a network having an access point STA4 with STA3 and STA5 connected thereto. STA1 is within radio wave range of STA4. In this way, problems similar to the above occur even in the case where an access point STA4 is within interference range of a terminal STA1 connected to another network, and wireless network usage efficiency worsens significantly.

In this way, in the case where it is desired to conduct space-division multiple access in circumstances where exclusive placement of frequency channels used by networks is difficult, such as with wireless LAN devices, it is preferable to perform control such that transmission sequences do not overlap in time among wireless networks or among devices.

For example, proposals have been made for a system that detects the presence of a nearby network by receiving a pilot signal (see PTL 2, for example). However, in typical wireless LAN systems pilot signals do not exist and only ordinary frames are transmitted, making utilization of this technology difficult. Also, a wireless network does not actively report to nearby equipment when its own signals will be transmitted. For this reason, it cannot be arranged in advance such that signals do not overlap among networks.

Also, proposals have been made for a wireless communication system that takes a resolving action once the problem of inter-network interference becomes significant (see PTL 3, for example). However, it is desirable to control networks such that the problem does not occur in the first place.

Also, neither system disclosed in PTL 2 and 3 assumes space-division multiple access. In a space-division multiple access system, the problem of inter-network interference is significantly exhibited compared to the case of carrying out a CSMA/CA system protocol with an ordinary wireless LAN system. For this reason, the inventors reason that there is a need for a methodology that discovers and coordinates inter-network interference problems earlier.

CITATION LIST

Patent Literature

PTL 1: Japanese Unexamined Patent Application Publication No. 2004-328570
PTL 2: Japanese Unexamined Patent Application Publication (Translation of PCT Application) No. 2007-510384
PTL 3: Japanese Unexamined Patent Application Publication No. 2005-287008

SUMMARY OF INVENTION

Technical Problem

An object of the present invention is to provide a superior communication system, a communication apparatus and communication method, and a computer program able to communicate optimally by applying space-division multiple access in which wireless resources on a spatial axis are shared by a plurality of users.

Another object of the present invention is to provide a superior communication system, a communication apparatus and communication method, and a computer program able to optimally realize space-division multiple access while avoiding inter-network interference.

Solution to Problem

This application has been devised with reference to the above problems, and the invention described in Claim 1 is a communication system consisting of a plurality of stations, including stations that conduct space-division multiple access using an array antenna, wherein
when conducting a transmission sequence unit whereby the learning of antenna coefficients and the transmission of information by space-division multiple access using learned antenna coefficients is conducted among a base station and one or more terminals, the base station transmits a first frame that reports, to the one or more terminals, time information related to a transmission sequence unit scheduled on its own network, and the one or more terminals transmit a second frame for reporting, to nearby stations, time information related to the transmission sequence unit in response to receiving the first frame.

However, the "system" discussed herein refers to the logical assembly of a plurality of apparatus (or function modules realizing specific functions), and it is not particularly specified whether or not respective apparatus or function modules exist within a single housing. (This applies similarly hereinafter.)

According to the invention described in Claim 2 of this application, in a communication system in accordance with Claim 1, it is configured such that the terminal sends a third frame that reports, to the base station, time information related to a second transmission sequence unit being scheduled on a network of a nearby station in response to receiving the second frame from that nearby station.

According to the invention described in Claim 3 of this application, in a communication system in accordance with Claim 2, it is configured such that the base station, on the basis of time information related to the second transmission sequence unit obtained by decoding the received third frame, adjusts the start time of the transmission sequence unit scheduled on its own network so as to not overlap in time with the second transmission sequence unit.

According to the invention described in Claim 4 of this application, in a communication system in accordance with Claim 2, the first frame, the second frame, and the third frame are transmitted as management frames.

According to the invention described in Claim 5 of this application, in a communication system in accordance with Claim 2, the first frame, the second frame, and the third frame are addressed and transmitted to a broadcast address.

According to the invention described in Claim 6 of this application, in a communication system in accordance with Claim 1, the second frame is transmitted as a frame addressed to the base station from the terminal.

Also, the invention described in Claim 7 of this application is a communication apparatus, comprising:

a communication unit able to conduct space-division multiple access using an array antenna; and a controller that controls communication operation by the communication unit;

wherein when the controller operates as a base station and conducts a transmission sequence unit whereby the learning of antenna coefficients and the transmission of information by space-division multiple access using learned antenna coefficients is conducted with one or more terminals, the controller causes a first frame to be transmitted which reports, to the one or more terminals, time information related to a transmission sequence unit scheduled on its own network, and in response to receiving a third frame from at least one of the one or more terminals that reports time information related to a second transmission sequence unit being scheduled on a network of a nearby station, adjusts the start time of the transmission sequence unit scheduled on its own network so as to not overlap in time with the second transmission sequence unit.

Also, the invention described in Claim 8 of this application is a communication method for conducting space-division multiple access using an array antenna, such that when operating as a base station and conducting a transmission sequence unit whereby the learning of antenna coefficients and the transmission of information by space-division multiple access using learned antenna coefficients is conducted with one or more terminals, the method includes:

a step of transmitting a first frame that reports, to the one or more terminals, time information related to a transmission sequence unit scheduled on its own network;

a step of receiving a third frame from at least one of the one or more terminals that reports time information related to a second transmission sequence unit being scheduled on a network of a nearby station; and a step of adjusting the start time of the transmission sequence unit scheduled on its own network so as to not overlap in time with the second transmission sequence unit, on the basis of time information related to the second transmission sequence unit obtained by decoding the received third frame.

Also, the invention described in Claim 9 of this application is a computer program stated in a computer-readable format such that processing for a communication apparatus to transmit frames is executed on a computer, the computer program causing the computer to function as a communication unit able to conduct space-division multiple access using an array antenna, and a controller that controls communication operation by the communication unit, wherein when the controller operates as a base station and conducts a transmission sequence unit whereby the learning of antenna coefficients and the transmission of information by space-division multiple access using learned antenna coefficients is conducted with one or more terminals, the controller causes a first frame to be transmitted which reports, to the one or more terminals, time information related to a transmission sequence unit scheduled on its own network, and in response to receiving a third frame from at least one of the one or more terminals that reports time information related to a second transmission sequence unit being scheduled on a network of a nearby station, adjusts the start time of the transmission sequence unit scheduled on its own network so as to not overlap in time with the second transmission sequence unit.

A computer program in accordance with Claim 9 of this application is defined to be a computer program stated in a computer-readable format such that given processing is executed on a computer. In other words, by installing a computer program in accordance with Claim 9 of this application onto a computer, cooperative action is exhibited on the computer, which operates as a base station on a network, thereby enabling operational advantages similar to those of a communication system in accordance with Claim 1 of this application to be obtained.

Also, the invention described in Claim 10 of this application is a communication system consisting of a plurality of stations, including stations that conduct space-division multiple access using an array antenna, wherein when conducting a transmission sequence unit whereby the learning of antenna coefficients and the transmission of information by space-division multiple access using learned antenna coefficients is conducted among a plurality of stations, the information source station transmits a first frame that reports, to one or more stations given to be information recipients, time information related to a transmission sequence unit scheduled on its own network, and the one or more stations given to be information recipients respectively transmit a second frame for reporting, to nearby stations, time information related to the transmission sequence unit in response to receiving the first frame.

Also, according to the invention described in Claim 11 of this application, in a communication system in accordance with Claim 10, it is configured such that the one or more stations given to be information recipients send a third frame that reports, to the information source station, time information related to a second transmission sequence unit being scheduled on a network of a nearby station in response to receiving the second frame from that nearby station.

Also, according to the invention described in Claim 12 of this application, in a communication system in accordance with Claim 11, it is configured such that the information source station, on the basis of time information related to the second transmission sequence unit obtained by decoding the received third frame, adjusts the start time of the transmission sequence unit scheduled on its own network so as to not overlap in time with the second transmission sequence unit.

Also, according to the invention described in Claim 13 of this application, in a communication system in accordance with Claim 11, the first frame, the second frame, and the third frame are transmitted as management frames.

Also, according to the invention described in Claim 14 of this application, in a communication system according to Claim 11, the first frame, the second frame, and the third frame are transmitted as beacon frames or probe response frames.

Also, according to the invention described in Claim 15 of this application, in a communication system in accordance with Claim 11, the first frame, the second frame, and the third frame are addressed and transmitted to a broadcast address.

Also, according to the invention described in Claim 16 of this application, in a communication system in accordance with Claim 10, the second frame is transmitted as a frame addressed to the information source station from the station given to be an information recipient.

Also, the invention described in Claim 17 of this application is a communication apparatus, comprising:
a communication unit able to conduct space-division multiple access using an array antenna; and
a controller that controls communication operation by the communication unit;
wherein
when the controller operates as an information source and conducts a transmission sequence unit whereby the learning of antenna coefficients and the transmission of information by space-division multiple access using learned antenna coefficients is conducted with one or more stations given to be information recipients, the controller causes a first frame to be transmitted which reports, to the one or more stations given to be information recipients, time information related to a transmission sequence unit scheduled on its own network, and in response to receiving a third frame from at least one of the one or more stations given to be information recipients that reports time information related to a second transmission sequence unit being scheduled on a network of a nearby station, adjusts the start time of the transmission sequence unit scheduled on its own network so as to not overlap in time with the second transmission sequence unit.

Also, the invention described in Claim 18 of this application is a communication method for conducting space-division multiple access using an array antenna, such that when operating as an information source and conducting a transmission sequence unit whereby the learning of antenna coefficients and the transmission of information by space-division multiple access using learned antenna coefficients is conducted with one or more stations given to be information recipients, the method includes:
a step of transmitting a first frame that reports, to the one or more stations given to be information recipients, time information related to a transmission sequence unit scheduled on its own network;
a step of receiving a third frame from at least one of the one or more stations given to be information recipients that reports time information related to a second transmission sequence unit being scheduled on a network of a nearby station; and
a step of adjusting the start time of the transmission sequence unit scheduled on its own network so as to not overlap in time with the second transmission sequence unit, on the basis of time information related to the second transmission sequence unit obtained by decoding the received third frame.

Also, the invention described in Claim 19 of this application is a computer program stated in a computer-readable format such that processing for a communication apparatus to transmit frames is executed on a computer, the computer program causing the computer to function as
a communication unit able to conduct space-division multiple access using an array antenna, and
a controller that controls communication operation by the communication unit,
wherein
when the controller operates as an information source and conducts a transmission sequence unit whereby the learning of antenna coefficients and the transmission of information by space-division multiple access using learned antenna coefficients is conducted with one or more stations given to be information recipients, the controller causes a first frame to be transmitted which reports, to the one or more stations given to be information recipients, time information related to a transmission sequence unit scheduled on its own network, and in response to receiving a third frame from at least one of the one or more stations given to be information recipients that reports time information related to a second transmission sequence unit being scheduled on a network of a nearby station, adjusts the start time of the transmission sequence unit scheduled on its own network so as to not overlap in time with the second transmission sequence unit.

A computer program in accordance with Claim 19 of this application is defined to be a computer program stated in a computer-readable format such that given processing is executed on a computer. In other words, by installing a computer program in accordance with Claim 19 of this application onto a computer, cooperative action is exhibited on the computer, which operates as an information source station on a network, thereby enabling operational advantages similar to those of a communication system in accordance with Claim 10 of this application to be obtained.

Advantageous Effects of Invention

According to the present invention, it is possible to provide a superior communication system, a communication apparatus and communication method, and a computer program able to optimally communicate by applying space-division multiple access in which wireless resources on a spatial axis are shared by a plurality of users.

Also, according to the present invention, it is possible to provide a superior communication system, a communication apparatus and communication method, and a computer program able to optimally realize space-division multiple access while avoiding inter-network interference.

According to the inventions described in Claims 1, 2, 7 to 11, and 17 to 19 of this application, it is possible to exchange time usage information for transmission sequence units among different networks or among non-adjacent equipment.

According to the inventions described in Claims 3 and 12 of this application, a base station that initiates its own transmission sequence unit disposes the start time for its own transmission sequence unit in a time slot which is not being used by an adjacent network or adjacent equipment. As a result, multiple wireless networks or wireless communication devices are able to utilize a channel by time division even in cases where exclusive placement of frequency channels is difficult, and efficient space-division multiple access can be realized.

Further objects, features, and advantages of the present invention will become apparent from the following detailed description based on embodiments of the present invention and the attached drawings.

DESCRIPTION OF EMBODIMENTS

Hereinafter, embodiments of the present invention will be explained in detail and with reference to the drawings.

With a space-division multiple access system, it is possible to spatially separate multiple user signals received contemporaneously by conducting signal processing that multiplies the outgoing/incoming signals of a plurality of antennas by wait values. It is also possible to contemporaneously distribute a plurality of signals to multiple users by multiplying signals by similar wait values and then transmitting.

Figure 1:
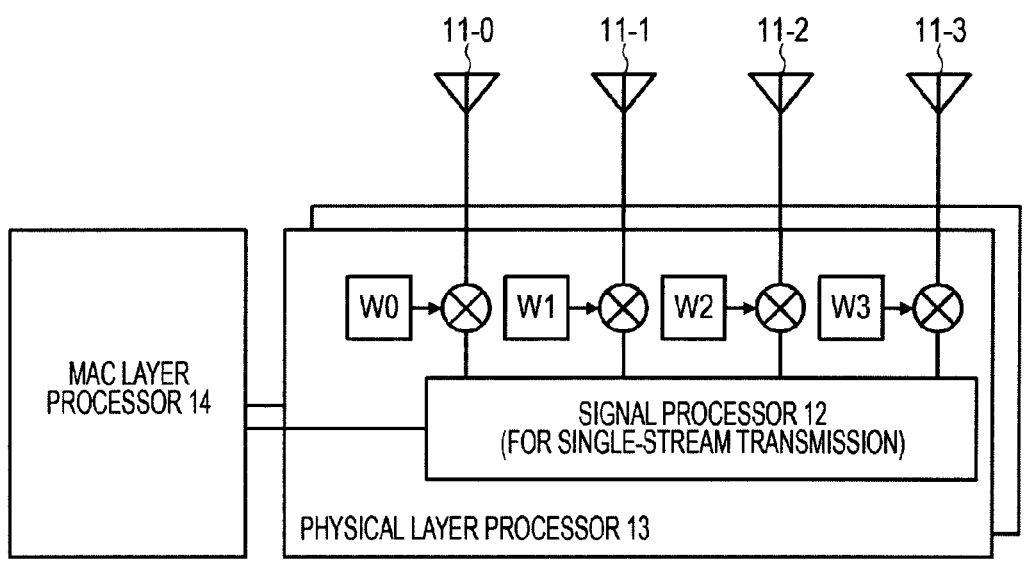
FIG. 1 is a diagram illustrating an exemplary configuration of a communication apparatus that realizes space-division multiple access.

FIG. 1 illustrates an exemplary configuration of a communication apparatus that realizes space-division multiple access. The illustrated communication apparatus is equipped with a plurality of transmission antennas 11-0, 11-1, etc. In a physical layer processor 12, input/output signals for the respective antennas 11-0, 11-1, etc. are respectively multiplied by wait values W0 to W3. In so doing, a signal processor 12 is able to handle single independent streams. Then, by providing transmission subsystems consisting of such a physical layer processor 13 in parallel, space-division multiple access becomes possible, and the communication apparatus can handle multiple streams.

These physical layer processors 13 provided in parallel are connected to a MAC layer processor 14, whereby signal processing necessary for a wireless LAN system is conducted.

Furthermore, in a space-division multiple access system, a plurality of MAC instances may operate in parallel in some cases.

The communication apparatus illustrated in FIG. 1 is taken to be able to operate as either an access point or a terminal in infrastructure mode, or alternatively, is able to autonomously communicate in ad hoc mode.

Figure 13:
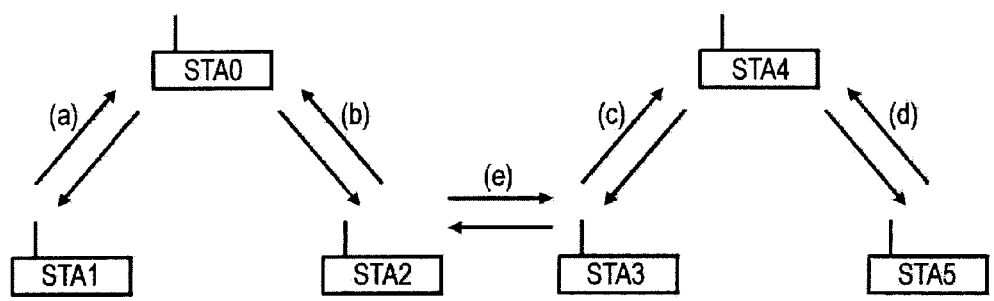
FIG. 13 is a diagram illustrating how a network composed of STA0 as an access point with STA1 and STA2 connected thereto and a network composed of STA4 as an access point with STA3 and STA5 connected thereto exist adjacent to each other.

At this point, operation of a station will be explained, taking by way of example a station arrangement in which a plurality of wireless networks overlap, as illustrated in FIG. 13. Each station STA0 to STA5 may be configured as the communication apparatus illustrated in FIG. 1.

In FIG. 13, a network composed of STA0 as an access point with STA1 and STA2 connected thereto and a network composed of STA4 as an access point with STA3 and STA5 connected thereto exist adjacent to each other. Also, while STA2 and STA3 are within each other's radio wave ranges, STA0 and STA4 are disposed in locations unable to receive each other's radio waves.

Figure 14:
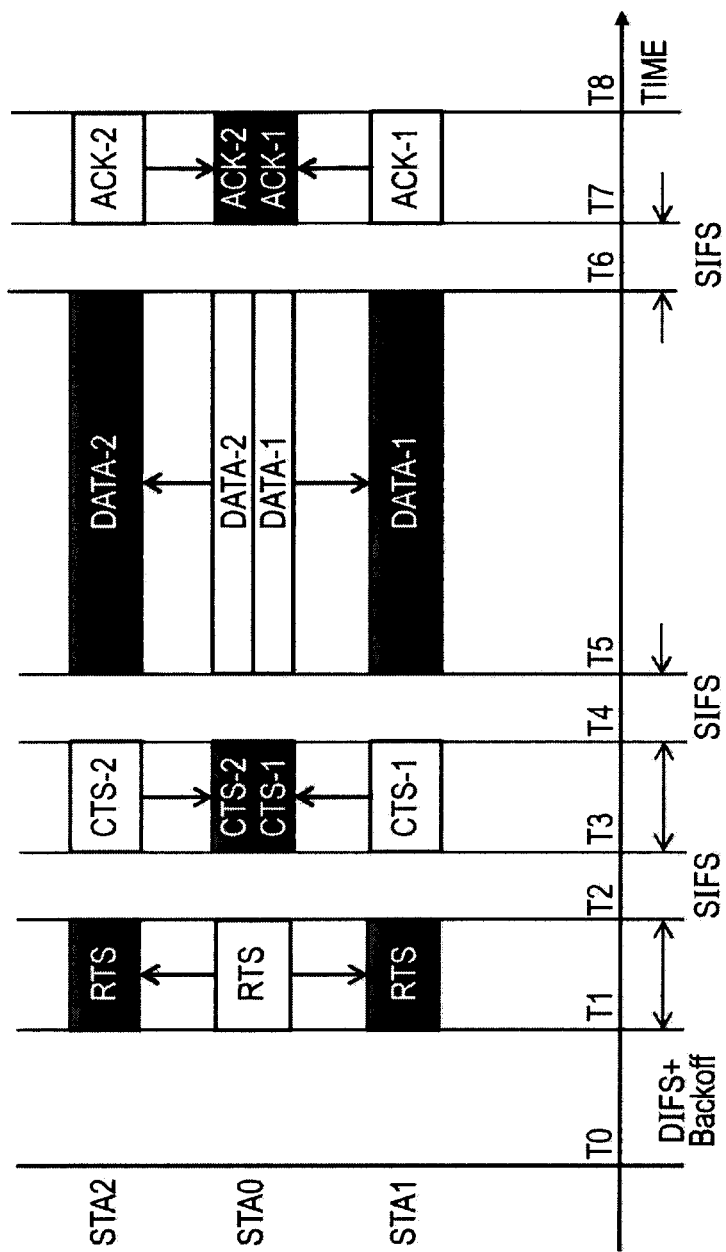
FIG. 14 is a diagram illustrating an exemplary transmission sequence using an RTS/CTS handshake in a space-division multiple access system.
Figure 15:
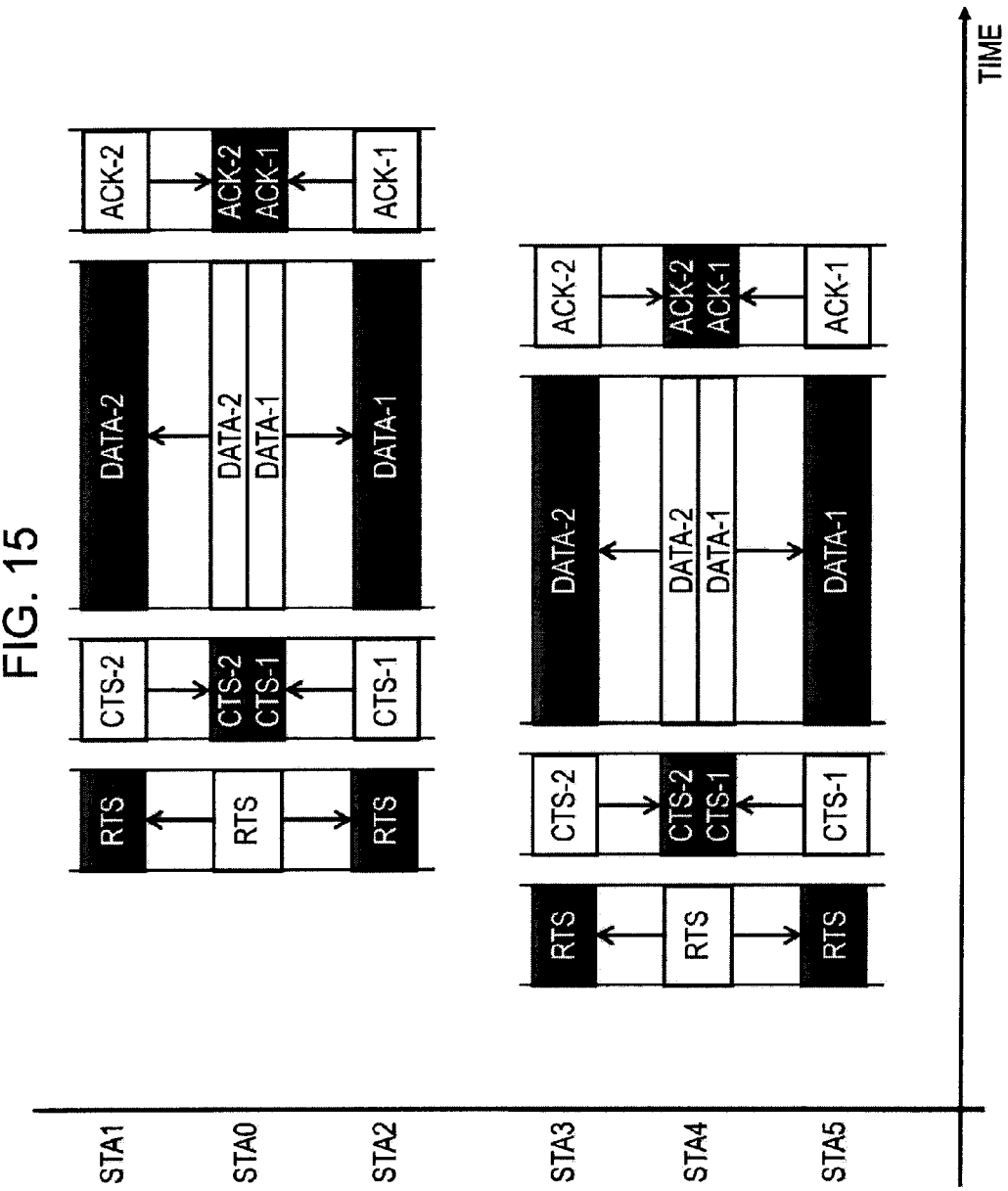
FIG. 15 is a diagram illustrating conditions where a STA0 transmission sequence and a STA4 transmission sequence overlap in time, and interference is produced between STA1 and STA3.
Figure 16:
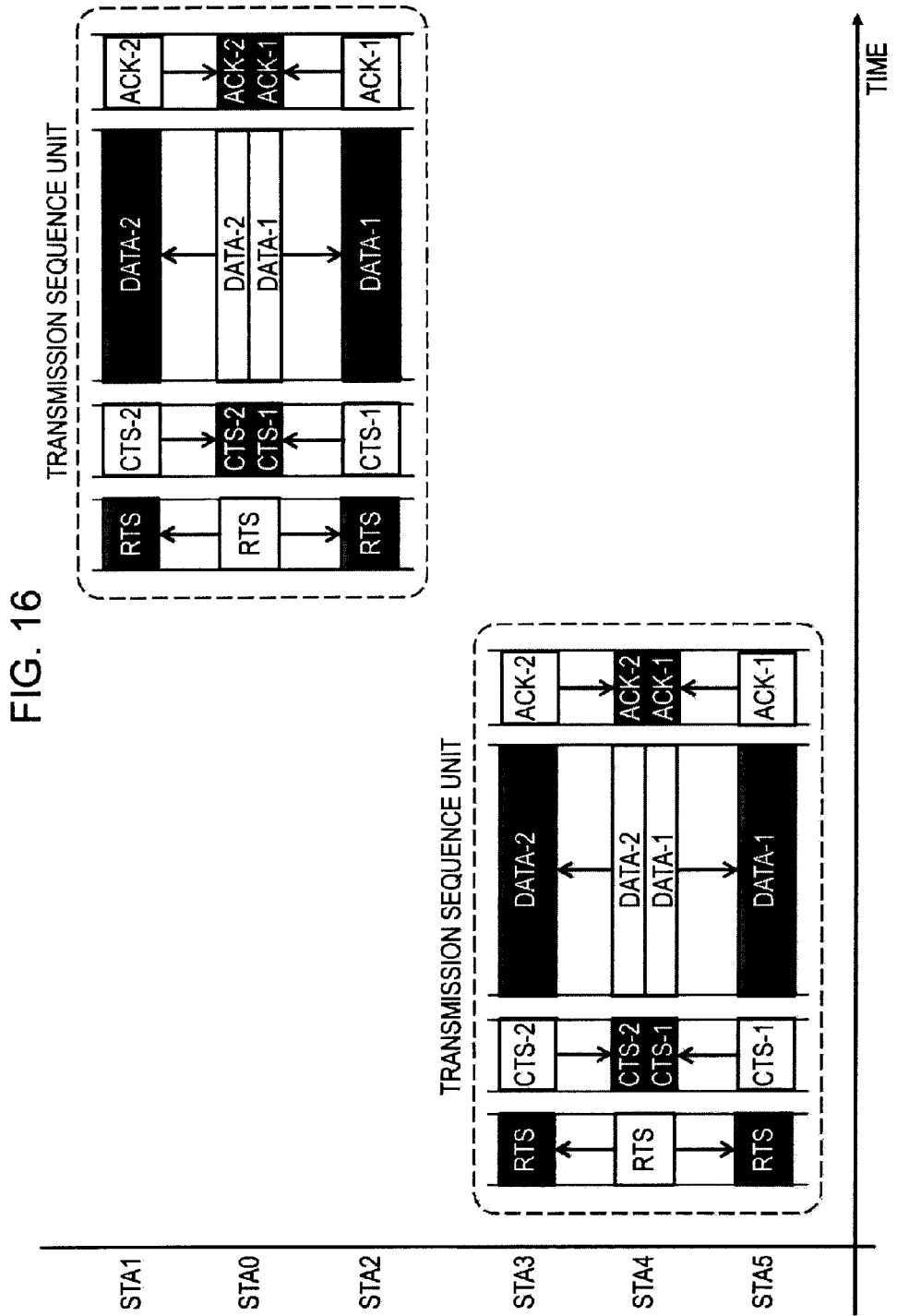
FIG. 16 is a diagram illustrating how transmission sequence units for each network are arranged so as to not overlap in time.

In the network consisting of STA0, STA1, and STA2, communication is conducted using sequences like that illustrated in FIG. 14. Also, in the network consisting of STA4, STA3, and STA5, communication is likewise conducted using sequences like that illustrated in FIG. 14.

Figure 2:
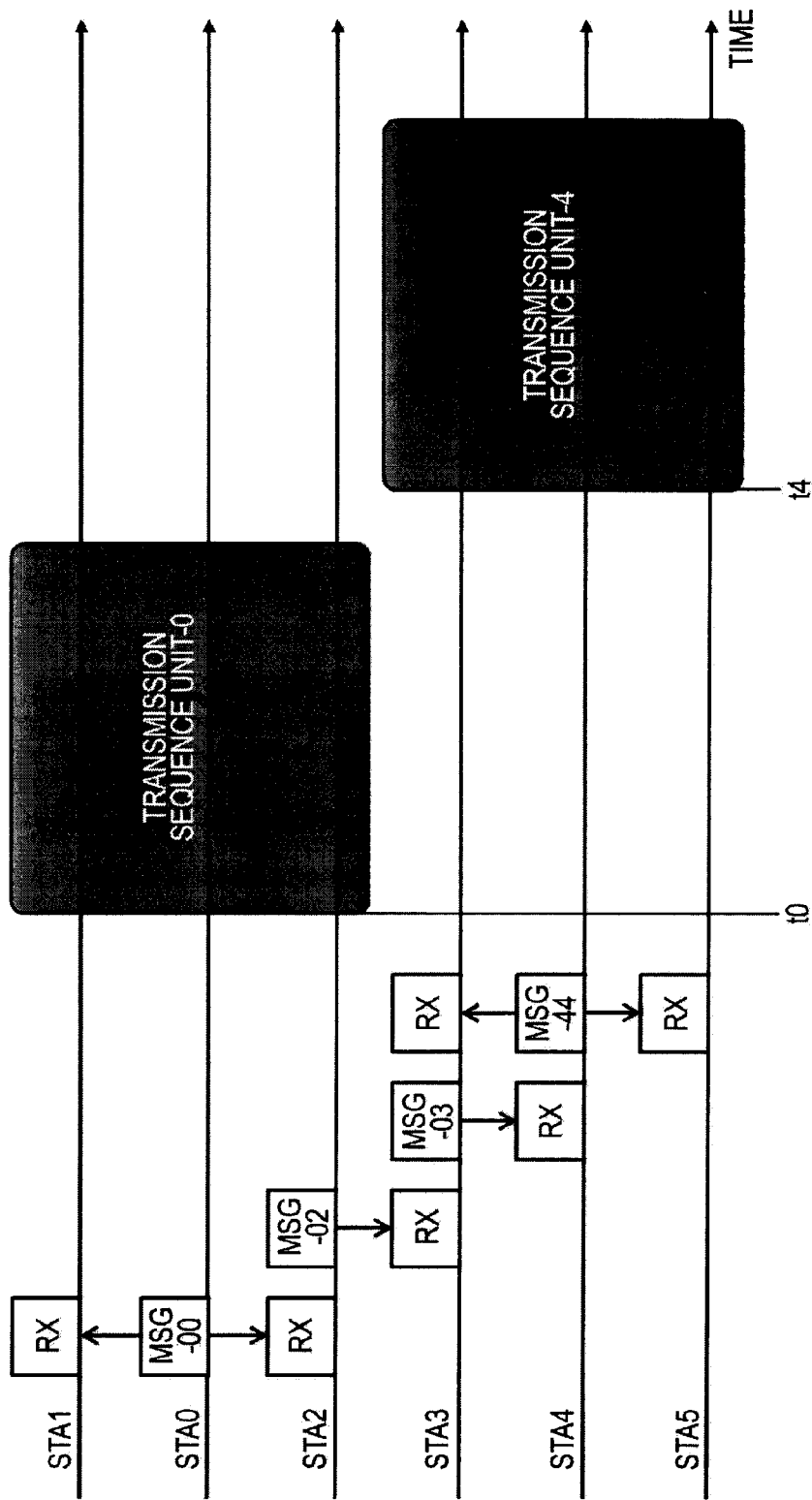
FIG. 2 is a diagram illustrating an exemplary communication sequence such that transmission sequence units for respective networks do not collide given the network topology illustrated in FIG. 13.

FIG. 2 illustrates an exemplary communication sequence such that transmission sequence units for respective networks do not collide given the network topology illustrated in FIG. 13. In the illustrated communication sequence, time usage information for transmission sequences is exchanged among different networks or among non-adjacent equipment, and on the basis of this information, a station that initiates a transmission sequence disposes its own transmission sequence time in a time slot which is not being used by an adjacent network or adjacent equipment.

First, STA0 transmits a message (MSG-00) containing "time information" which includes information such as the transmission sequence start time and transmission sequence duration that STA0 is scheduling, the transmission sequence recurrence interval, etc. In MSG-00, it is stated that the illustrated transmission sequence unit-0 is scheduled from a time t0.

Furthermore, although omitted in FIG. 2, in every transmission sequence unit, information is transmitted from an access point to a plurality of terminals by using an RTS/CTS handshake like that illustrated in FIG. 14, for example. In this specification, the series of sequences in which the learning of antenna coefficients and the transmission of information by space-division multiple access using learned antenna coefficients is conducted between an information source and an information recipient is defined to be a "transmission sequence unit".

Upon receiving the message MSG-00, STA1 and STA2 are able to obtain information on the future timing that STA0, the message source, is scheduling for the transmission sequence unit-0.

STA1 and STA2, upon determining that frame transmission is not necessary until the start time t0 of the next transmission sequence unit-0, may conduct power-saving operation until time t0.

The message MSG-00 sent from STA0 that includes "time information on a transmission sequence being scheduled by me" may be addressed and sent to just the stations in a communicating relationship with STA0 in some cases, but since it is information that should also be received by stations on the other overlapping network, it is desirable that the message be addressed to a broadcast address and sent such that it will also be received by stations belonging to other logical networks.

STA1 and STA2 send time information containing the same content as the time information issued by STA0 with MSG-00, in order to further propagate the time information for the transmission sequence unit-0 being scheduled by STA0 to nearby stations. In FIG. 2, this corresponds to the message MSG-02 sent by STA2. Meanwhile, since STA1 is unable to confirm the existence of another nearby station, it determines that forwarding MSG-00 to nearby stations is unnecessary, and in the illustrated example does not send a message equivalent to MSG-02. However, it may also be configured such that STA1 does send a message equivalent to MSG-02, regardless of nearby station conditions.

Herein, The message MSG-02 sent from STA2 that includes "time information on a transmission sequence being scheduled by a peer" may be addressed and sent to just the stations in a communicating relationship with STA2 in some cases, but since it is information that should also be received by stations on the other overlapping network, it is desirable that the message be addressed to a broadcast address and sent such that it will also be received by stations belonging to other logical networks.

STA3, upon receiving the message MSG-02 sent by the nearby station STA2, is able to recognize the future timing at which STA2 will conduct the transmission sequence unit-0. At this point, STA3 may in some cases determine whether or not the timing of the transmission sequence unit-0 to be used by STA2 overlaps the timing of a transmission sequence unit to be used by STA3 itself. In the case where it is determined that the two overlap, STA3 sends the message MSG-03 in FIG. 2 to STA4, its peer access point, in order to report the time information in MSG-02 announced by STA1. It may also be configured such that STA3 sends the message MSG-03 to STA4 without determining whether or not the transmission sequence unit timings overlap as above.

By decoding the contents of the message MSG-03 received from STA3, STA4 is able to ascertain the times at which there is a possibility that STA3 will receive interference. Then, on the basis of this information, STA4 schedules the schedule time for its own transmission sequence unit-4 so as to not overlap with the transmission sequence unit-0. In the example illustrated in FIG. 2, STA4 arranges the transmission sequence unit-4, which includes frames addressed to STA3, starting from a time t4.

However, the principal matter of the present invention is not limited to a specific method for determining whether or not the transmission sequence units of respective logical networks overlap. For example, a methodology like that indicated in PTL 3 may be used in order to determine overlaps in transmission sequence units.

Additionally, STA4 sends a message MSG-44 containing schedule information for this transmission sequence unit-4 as "time information" similar to the above. In MSG-44, it is stated that the transmission sequence unit-4 is scheduled from time t4. Upon receiving the message MSG-44 and decoding its contents, STA3 and STA5 obtain information on the future timing that STA4 is scheduling for the transmission sequence unit-4.

The message MSG-44 sent from STA4 that includes "time information on a transmission sequence being scheduled by me" may be addressed and sent to just the stations in a communicating relationship with STA4 in some cases. However, since it is information that should also be received by stations on the other overlapping network, it is desirable that the message MSG-44 be addressed to a broadcast address and sent such that it will also be received by stations belonging to other logical networks.

The exemplary communication sequence for network collision avoidance illustrated in FIG. 2 assumes the case where terminals (STA2, STA3) and not access points interfere with each other, as illustrated in FIG. 13. In contrast, conditions may also exist wherein a terminal STA1 directly interferes with an access point STA4 other than the access point STA0 to which STA1 is connected (or housed inside), as illustrated in FIG. 17.

Figure 17:
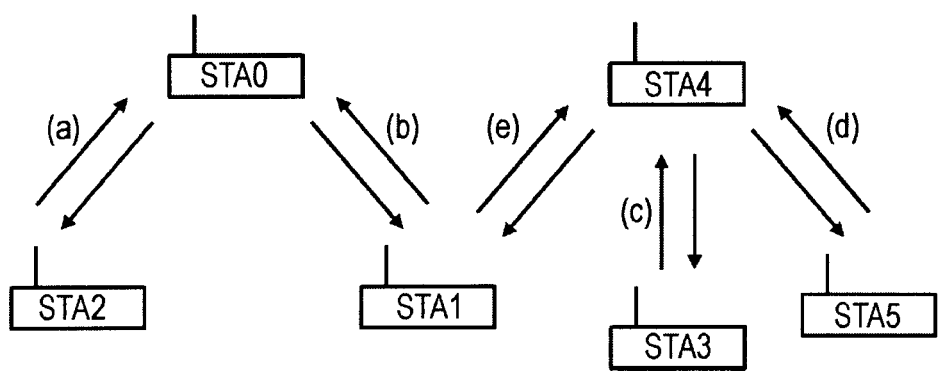
FIG. 17 is a diagram illustrating another exemplary station arrangement in which a plurality of networks overlap.

In the case of the example illustrated in FIG. 17, an outgoing message MSG-01 from a terminal STA1 is directly propagated to another access point STA4. Then, by decoding the contents of the message MSG-01, STA4 is able to recognize the time slot to be used by the overlapping wireless network, and thus schedules the schedule time for its own transmission sequence unit-4 so as to not overlap with the transmission sequence unit-0, as discussed earlier.

The messages used in the communication sequence illustrated in FIG. 2 (MSG-00, etc.) may be sent as action frames in which the "time information" is stated independently. An action frame is a type of management frame requesting that an action take place between stations, and is also defined in IEEE 802.11. Alternatively, "time information" or other information related to a transmission sequence unit may be sent contained in a frame such as a beacon frame or a probe response frame. A beacon frame is a frame for announcing information required for network operation, while a probe response frame is a response frame from an access point responding to a probe request frame sent from a terminal in order to detect a network. Both beacons and probe responses are also defined in IEEE 802.11 as frames in which typical control information is stated. Also, they may be contained in part of another typical frame.

Figure 3:
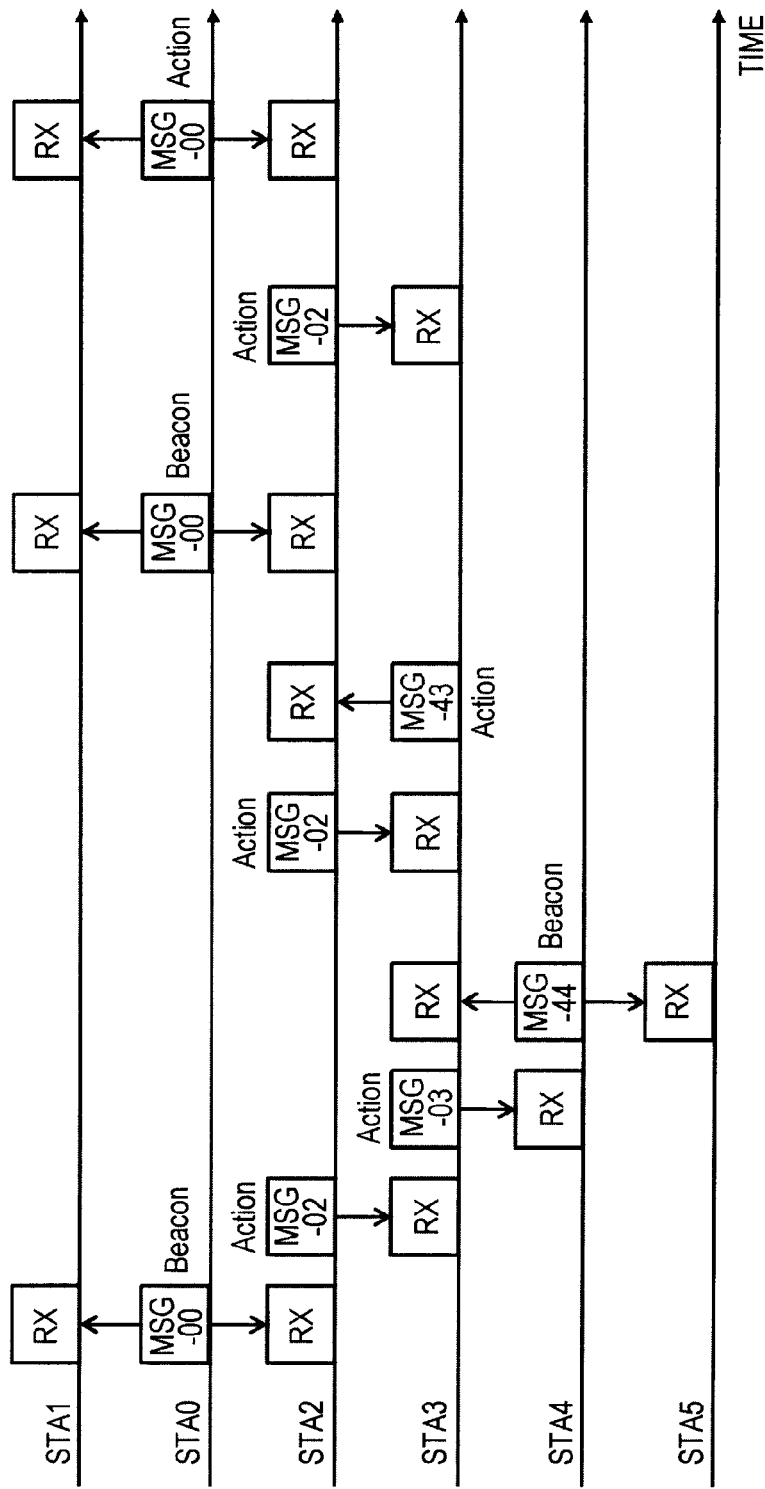
FIG. 3 is a diagram illustrating an exemplary communication sequence for the case where information related to a transmission sequence unit, such as "time information", is transmitted using a beacon frame by an access point, and transmitted using an action frame by a terminal.

FIG. 3 illustrates an exemplary communication sequence for the case where information related to a transmission sequence unit, such as "time information", is transmitted using a beacon frame by an access point and transmitted using an action frame by a terminal given the network topology illustrated in FIG. 13.

First, upon scheduling a transmission sequence unit-0, STA0 sends a beacon frame stating information such as the "time information" (equivalent to MSG-00) at a given beacon transmission timing.

Upon receiving the beacon frame from STA0, STA1 and STA2 are able to obtain information on the future timing that STA0 is scheduling for the transmission sequence unit-0.

STA2 sends an action frame stating the "time information", etc. (equivalent to MSG-02) in order to further propagate the time information for the transmission sequence unit-0 being scheduled by STA0 to nearby stations. Meanwhile, since STA1 is unable to confirm the existence of another nearby station, it determines that forwarding information to nearby stations is unnecessary, and in the illustrated example does not send an action frame.

STA3, upon receiving the action frame MSG-02 from the nearby station STA2, is able to recognize the future timing at which STA2 will conduct the transmission sequence unit-0. At this point, STA3 may determine whether or not the timing of the transmission sequence unit-0 to be used by STA2 overlaps the timing of a transmission sequence unit to be used by STA3 itself. In the case where it is determined that the two overlap, STA3 sends an action frame (equivalent to MSG-03) to STA4, its peer access point, in order to report the "time information", etc. Alternatively, it may be configured such that STA3 sends an action frame to STA4 without determining whether or not the transmission sequence unit timings overlap as above.

By decoding the contents of the action frame received from STA3, STA4 is able to ascertain the times at which there is a possibility that STA3 will receive interference. Then, on the basis of this information, STA4 schedules the schedule time for its own transmission sequence unit-4 so as to not overlap with the transmission sequence unit-0. After that, STA4 sends a beacon frame stating information such as the "time information" (equivalent to MSG-44) at a given beacon transmission timing.

Upon receiving the beacon frame MSG-44 from STA4, STA3 is able to obtain information on the future timing that STA3 is scheduling for the transmission sequence unit-4. Then, STA3 sends an action frame stating "time information" etc. (MSG-43) in order to further propagate the time information for the transmission sequence unit-4 to nearby stations.

After that, the access points STA0 and STA4 repeatedly send beacon frames containing information equivalent to MSG-00 or MSG-44 every time their respective beacon transmission timings are reached.

Figure 4:
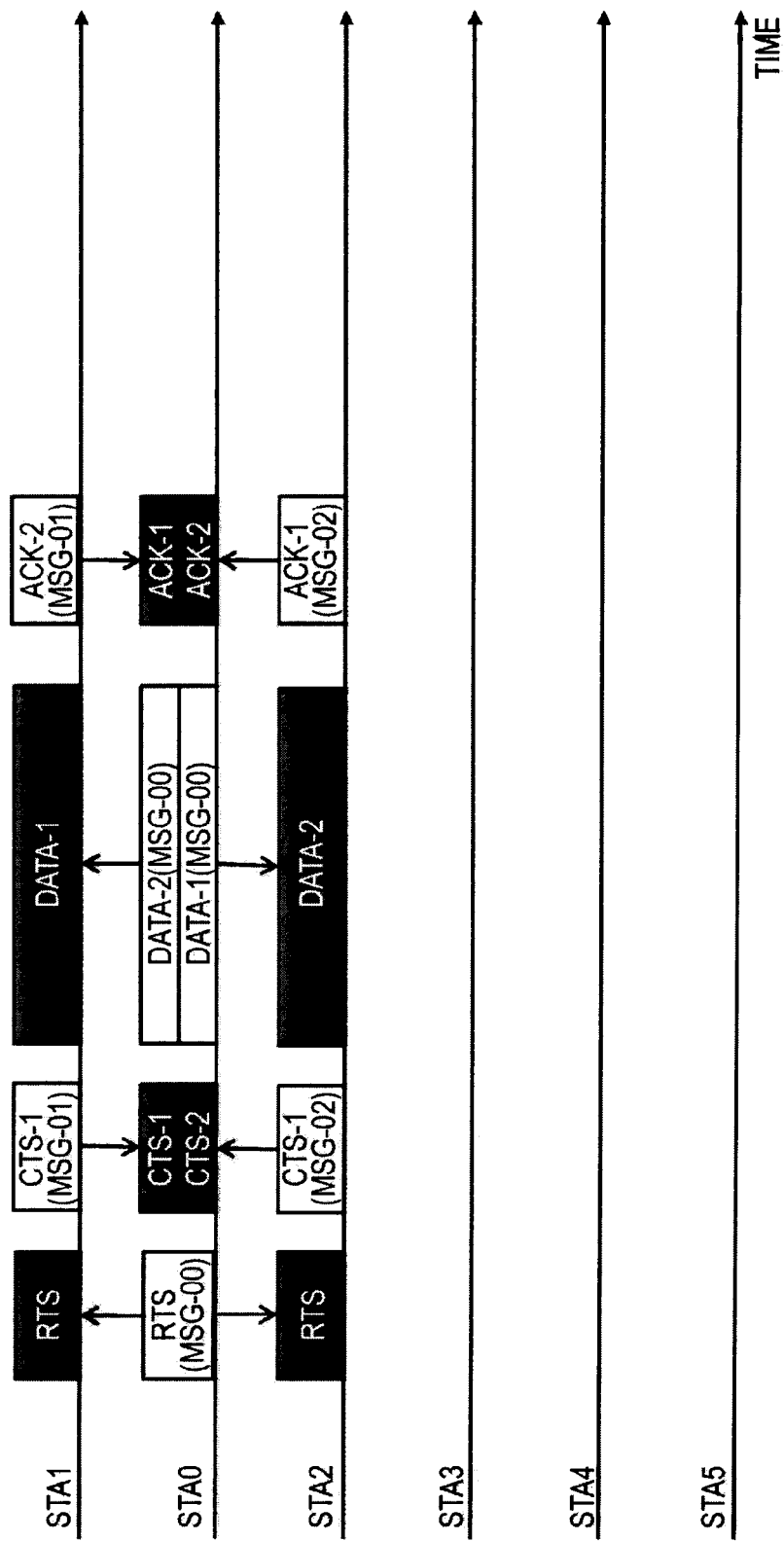
FIG. 4 is a diagram illustrating an exemplary communication sequence for the case where information related to a transmission sequence unit, such as "time information", is transmitted by being included inside a typical frame.

Also, FIG. 4 illustrates an exemplary communication sequence for the case of transmitting information related to a transmission sequence unit, such as "time information", contained in typical frames when given the network topology illustrated in FIG. 13. The method for including information in a frame discussed herein is also taken to include multiplexing. Also, in the illustrated example, "time information" is transmitted via an RTS/CTS handshake, and control frames such as RTS, CTS, and ACK are used as the typical frames. Furthermore, although these frames are referred to as RTS frames and CTS frames herein for the sake of convenience, these frames may be referred to by different names in some cases.

STA0 conducts physical carrier sensing in advance and confirms that the medium is clear, and after additionally conducting a backoff, sends an RTS frame which indicates that STA0 will transmit information to STA1 and STA2 by space-division multiple access. At this point, STA0 includes information such as "time information" for the scheduled transmission sequence unit-0 in the RTS frame by multiplexing.

In response to receiving an RTS frame, STA1 and STA2 contemporaneously transmit respective CTS frames (CTS-1, CTS2) in order to indicate that they are in a state able to receive information. At this point, STA1 and STA2 include "time information", etc. in the individual CTS frames in order to further propagate the time information for the transmission sequence unit-0 being scheduled by STA0 to nearby stations (hidden terminals to STA0). Also, STA1 and STA2 also include "time information" for transmission sequence units on adjacent networks that was acquired from nearby stations in their CTS frames.

STA0, on the basis of the incoming signals of the received CTS-1 and CTS-2, multiplies these signals by a wait value for each antenna element required for spatial separation, thereby separating and receiving the two signals. Additionally, STA0 uses this wait value to contemporaneously transmit DATA frames (DATA-1, DATA-2) to STA1 and STA2. At this point, STA0 includes information such as the "time information" for the scheduled transmission sequence unit-0 in each DATA frame (DATA-1, DATA-2).

DATA-1 and DATA-2 are frames transmitted by signals that are sent while taking into account the wait coefficients of the antennas such that interference does not occur at their destinations. STA1 is able to receive DATA-1, while STA2 is able to receive DATA-2.

Once STA1 and STA2 finish receiving their respective DATA frames, they contemporaneously reply with ACK frames (ACK-1, ACK-2). At this point, STA1 and STA2 include "time information", etc. in their individual ACK frames in order to further propagate the time information for the transmission sequence unit-0 being scheduled by STA0 to nearby stations (hidden terminals to STA0). Also, STA1 and STA2 include "time information" for transmission sequence units on adjacent networks that was acquired from nearby stations in their ACK frames.

STA0 then receives these ACK frames, thereby ending a sequence for transmitting data to multiple stations using space-division multiple access.

In the exemplary communication sequence illustrated in FIG. 4, it is possible to reduce the overhead of transmitting independent frames such as action frames by including and transmitting such information in frames used to transmit data as discussed above. However, time information is not necessarily required to be included in all frames every time.

Figure 5:
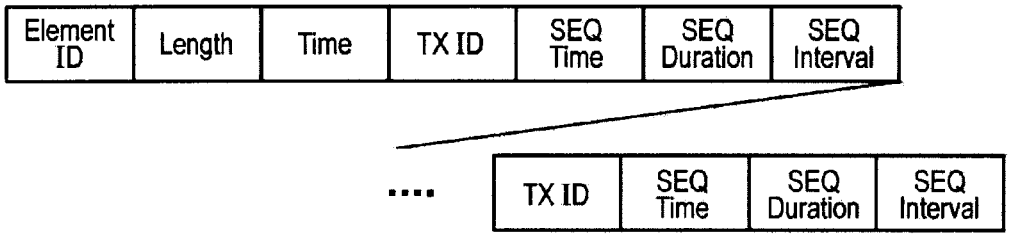
FIG. 5 is a diagram illustrating an exemplary configuration of a time information element (TIME IE) stating "time information" related to a transmission sequence unit.

FIG. 5 illustrates an exemplary configuration of a time information element Time IE which states "time information" related to a transmission sequence unit. In the illustrated example, an information element is composed of the following fields.

(1) Element ID: an identifier indicating that the current element states time information.

(2) Length: indicates the length of the current element. (A time information element is variable-length in some cases.)

(3) Time: a value indicating the transmission time of the current frame.

(4) TXID: an identifier that identifies a transmission sequence unit. (The identifier is composed of a numerical value assigned by the station that determines the transmission sequence unit, and a flag that identifies sending/receiving. By referencing this flag, it can be determined by reference whether the current time information is information related to sending or information related to receiving.)

(5) SEQ Time: the scheduled start time for the transmission sequence unit (expressed on the basis of the time indicated in the above Time field).

(6) SEQ Duration: the scheduled duration of the transmission sequence unit.

(7) SEQ Interval: the interval (period) of the transmission sequence unit.

Herein, the above fields (4) to (7) are a single set that state "time information" for a one transmission sequence unit per set. By stating multiple sets of (4) to (7) in an information element Time IE, "time information" for a plurality of transmission sequence units can be expressed contemporaneously. Time information is transmitted in a form like the above.

With the communication sequences illustrated in FIGS. 2 to 4, respective frames that perform the role of propagating "time information" may be used.

Figure 6A:
FIG. 6A is a diagram illustrating a PSDU format for an RTS frame in which a time information element is stated.
Figure 6B:
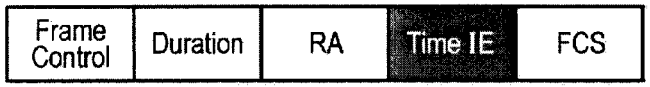
FIG. 6B is a diagram illustrating a PSDU format for a CTS/ACK frame in which a time information element is stated.
Figure 6C:
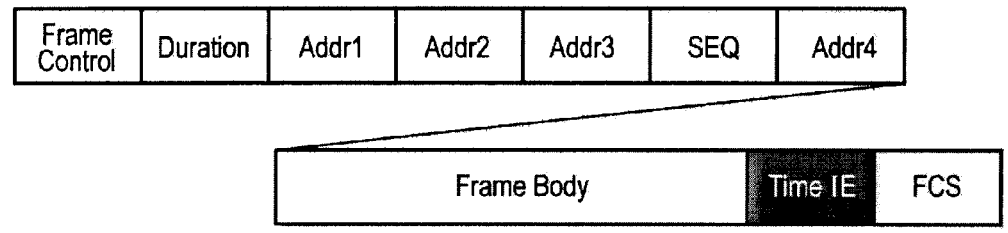
FIG. 6C is a diagram illustrating a PSDU format for a DATA frame in which a time information element is stated.
Figure 6D:
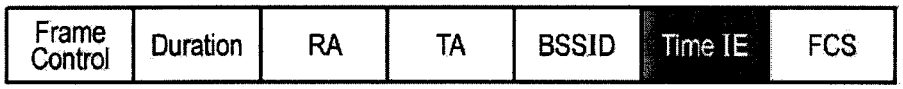
FIG. 6D is a diagram illustrating a PSDU format for an action frame in which a time information element is stated.
Figure 6E:
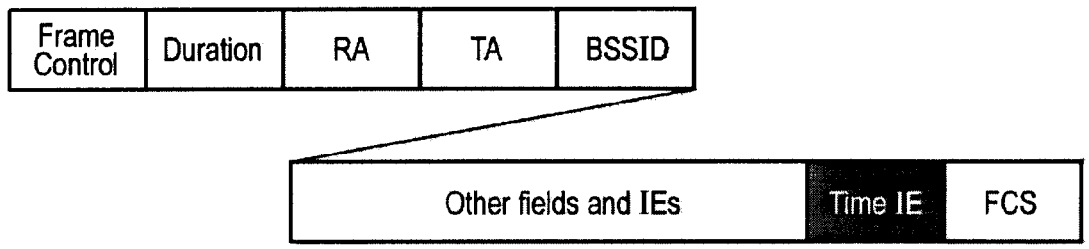
FIG. 6E is a diagram illustrating a PSDU format for a beacon or probe response frame in which a time information element is stated.
Figure 11A:
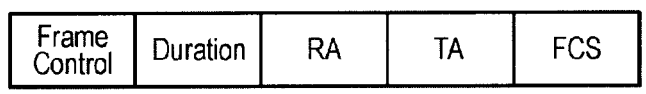
FIG. 11A is a diagram illustrating a PSDU format for an RTS frame defined in IEEE 802.11.
Figure 11B:
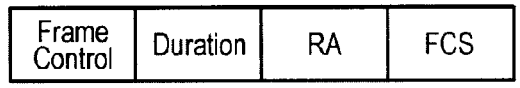
FIG. 11B is a diagram illustrating a PSDU format for CTS/ACK frames defined in IEEE 802.11.
Figure 11C:
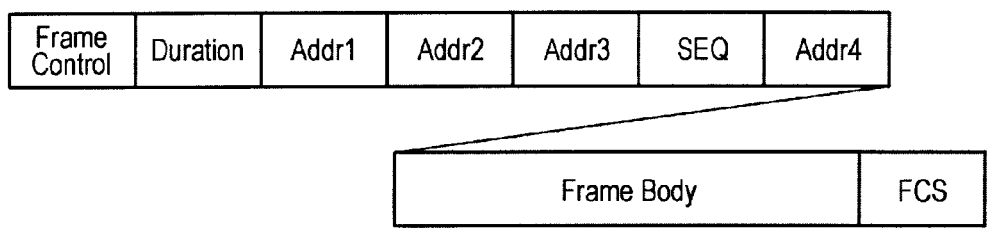
FIG. 11C is a diagram illustrating a PDSU format for a DATA frame defined in IEEE 802.11.
Figure 12:
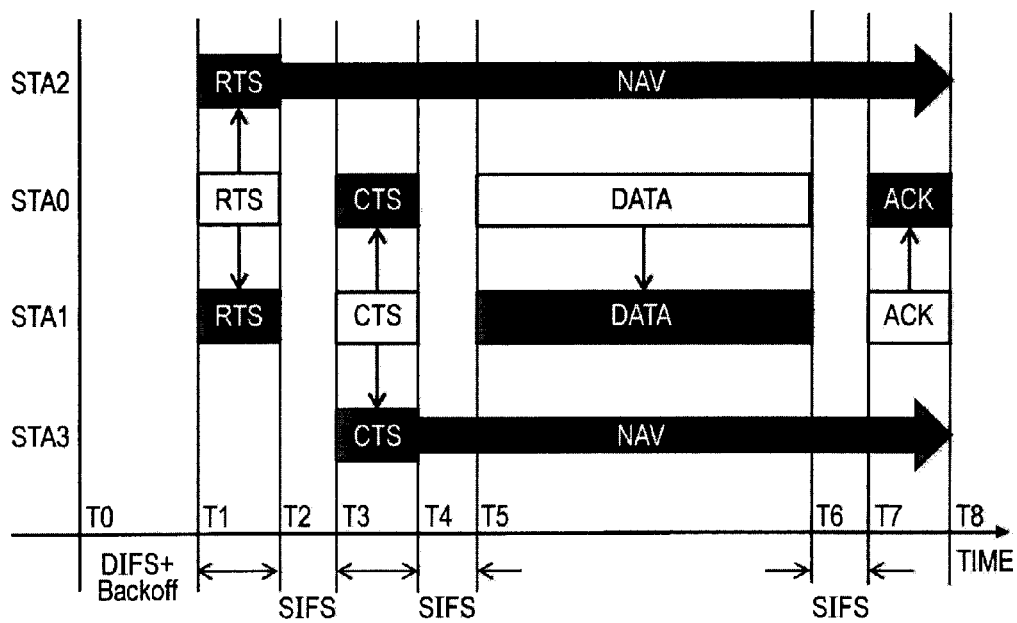
FIG. 12 is a diagram for explaining an exemplary RTS/CTS communication sequence.

FIGS. 11A to 11C illustrated PSDU formats for respective RTS, CTS/ACK, and DATA frames defined in IEEE 802.11. In contrast, FIGS. 6A to 6E illustrate PSDU formats of respective RTS, CTS/ACK, DATA, action, and beacon/probe response frames in which time information elements are stated and which are used in the respective exemplary communication sequences illustrated in FIGS. 2 to 4. The exemplary configuration of the Time IE field included in each frame is as illustrated in FIG. 5, while other fields are as already explained. In the exemplary communication sequence illustrated in FIG. 4, a time information element is added to the ordinary frame fields and sent in typical frames such as RTS, CTS/ACK, and DATA, as illustrated in FIGS. 6A to 6C. A time information element is stored in the payload and sent in management frames such as an action frame, as illustrated in FIG. 6D. Also, a time information element is added to other fields and information elements stated in an ordinary beacon or probe response and sent, as illustrated in FIG. 6E.

Figure 7:
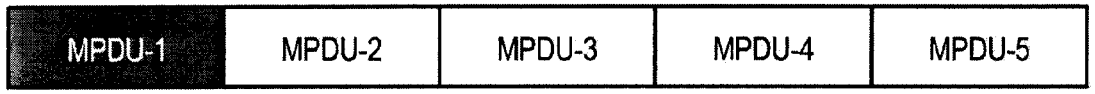
FIG. 7 is a diagram illustrating an exemplary configuration in which a time information element is stated in part of an Aggregated frame that stores a plurality of MPDUs in a single PSDU.

Also, with IEEE 802.11n which is related to high-speed communication, an Aggregated frame format is defined, which reduces overhead by constructing a single physical layer data unit from a plurality of frames (MPDUs (MAC Protocol Data Units) or MMPDUs (MAC Management Protocol Data Units). FIG. 7 illustrates an exemplary configuration in which a time information element is stated in part of an Aggregated frame that stores a plurality of MPDUs in a single PSDU. In the illustrated example, five MPDUs are aggregated. Of these, the first MPDU (MPDU-1) is storing content equivalent to an action frame storing a time information element. The subsequent MPDUs (MPDU-2, MPDU-3, etc.) respectively store content equivalent to the data frame illustrated in FIG. 11A.

In the foregoing description, an infrastructure network composed of an access point and client devices connected thereto was taken by way of example. However, other forms of wireless network exist such as ad hoc networks or mesh networks, wherein respective stations autonomously control their behavior and establish links where each station has equal standing. Hereinafter, a method of operating a space-division multiple access system in accordance with the present invention will be explained, taking by way of example an ad hoc mesh network configured without a specific control station.

In the case where a specific control station does not exist on the network, each station determines transmission sequence timings for its own outgoing frames by itself. For example, in the case where there exist three autonomously operating stations STA0, STA1, and STA2 communicating with each other, STA0 determines timings for transmissions addressed to STA1 and STA2. Similarly, STA1 determines timings for transmissions addressed to STA0 and STA2, while STA2 determines timings for transmissions addressed to STA0 and STA1.

In the following explanation, it is presumed that each of the stations STA0 to STA2 periodically send a beacon signal with the intention of announcing autonomous control information to individual nearby stations. Also, the respective stations STA0 to STA2 are taken to be provided with the ability to send a probe response frame as necessary upon receiving a probe request frame.

Stations STA0 to STA5 are arranged as illustrated in FIG. 13 and constitute a mesh network, or a plurality of overlapping wireless networks. In the same drawing, each station is a station that conducts autonomous operation, but each is only within radio wave range of its neighboring stations. Each station is using space-division multiple access to contemporaneously deliver data addressed to a plurality of stations. Also, STA4 is using a space-division multiple access communication sequence like that illustrated in FIG. 14 to communicate with STA3 and STA5. In the case where STA1 wants to contemporaneously send data to STA0 and STA3, STA1 similarly transmits by space-division multiple access.

Figure 8:
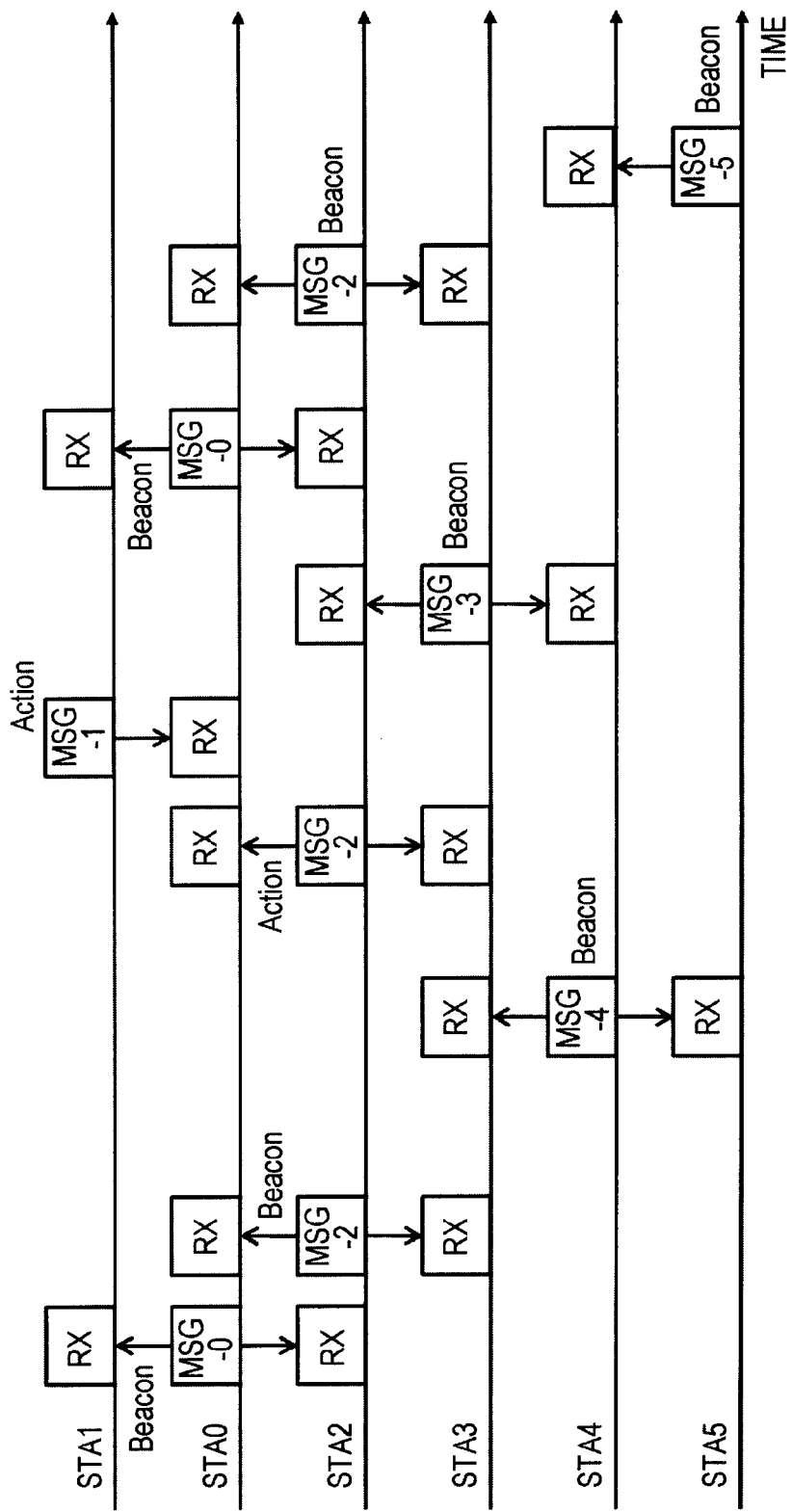
FIG. 8 is a diagram illustrating an exemplary communication sequence controlled such that the transmission sequences of respective stations do not collide with each other in an ad hoc communication environment.

FIG. 8 illustrates an exemplary communication sequence controlled such that the transmission sequences of respective stations do not collide with each other in such an ad hoc communication environment.

STA0 sends a beacon frame stating information such as "time information" for a scheduled transmission sequence unit (equivalent to MSG-0) at a given beacon transmission timing.

Upon receiving the beacon frame from STA0, STA1 and STA2 are able to acquire information on the future timing that STA0 is scheduling for a transmission sequence unit. Then, STA1 and STA2 schedule the schedule times of their own transmission sequence units on the basis of this information so as to not collide with STA0's transmission sequence unit.

Herein, STA1 and STA2, upon determining that frame transmission is not necessary until the start time of the next transmission sequence unit, may conduct power-saving operation until that start time.

The message MSG-0 containing time information may be addressed and sent to just the stations in a communicating relationship with the sending station in some cases, but since it is information that should also be received by stations on the other overlapping network, it is desirable that the message be addressed to a broadcast address and sent such that it will also be received by stations belonging to other logical networks.

Thus, STA1 and STA2 generate new time information by adding the time information for a transmission sequence unit to be received that was obtained from MSG-0 from STA0 to time information for their own transmission sequence units, and respectively send frames for propagating this time information to nearby stations. This is equivalent to the message that STA1 sends as MSG-1 and the message that STA2 sends as MSG-2 in FIG. 8. Similarly to MSG-0, since MSG-1 and MSG-2 are information that should also be received by stations on the other overlapping network, it is desirable that the messages be addressed to a broadcast address and sent such that they will also be received by stations belonging to other logical networks. In FIG. 8, STA1 states and propagates the message MSG-1 in an action frame, while STA2 states and propagates the message MSG-2 in a beacon frame and an action frame.

Also, STA4 sends a beacon frame stating information such as "time information" for a scheduled transmission sequence unit (equivalent to MSG-4) at a given beacon transmission timing.

STA3 decodes the contents of the beacon frames individually received from STA1 and STA4, and ascertains the times at which there is a possibility that it will receive interference. Thus STA3 is able to schedule the schedule time for a transmission sequence unit to be used by STA3 itself so as to not overlap with the transmission sequence units to be used by the respective nearby stations.

STA2 also propagates a message MSG-2 containing time information to nearby stations with an action frame.

Upon receiving the action frame from STA2, STA0 and STA3 obtain information on the future timing that STA2 is scheduling for a transmission sequence unit. On the basis of this information, STA0 and STA3 schedule the schedule times of their own transmission sequence units so as to not overlap with STA0's transmission sequence unit.

Further explanation is omitted or reduced, but according to the exemplary communication sequence illustrated in FIG. 8, each station generates "time information" collecting together its own transmission sequence unit time information with transmission sequence unit time information received from nearby stations, and propagates it to nearby stations.

Figure 9:
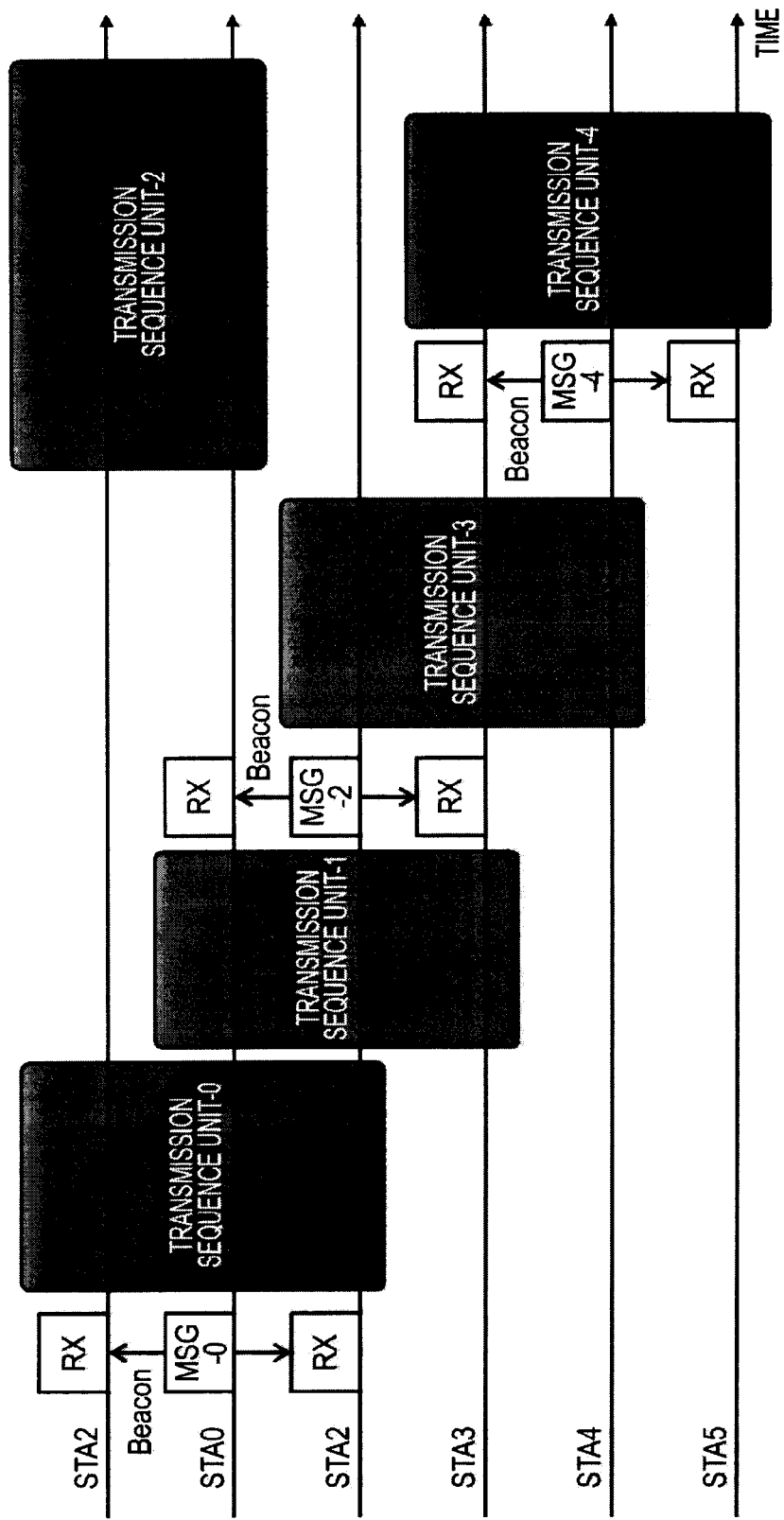
FIG. 9 is a diagram illustrating how time information for transmission sequence units is reported via beacon frames transmitted every given beacon transmission timing, and how each station successively schedules a time for its own transmission sequence unit in FIG. 9.
Figure 10:
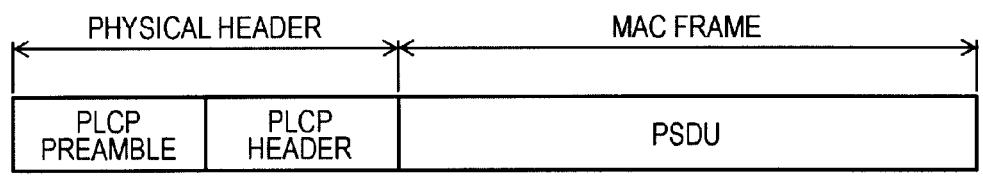
FIG. 10 is a diagram illustrating a major frame format used for an RTS/CTS handshake in an IEEE 802.11 system.

The respective stations cross-reference their own transmission sequence unit time information with transmission sequence unit time information received from nearby stations, and schedule the times for their own transmission sequence units so as to not overlap with each other. As a result, the system as a whole is scheduled such that the transmission sequence units up to two hops ahead, for example, do not overlap. FIG. 9 illustrates how time information for transmission sequence units is reported via beacon frames transmitted every given beacon transmission timing, and how each station successively schedules a time for its own transmission sequence unit. Herein, detailed explanation of the method for determining whether or not transmission sequence units overlap in the present invention is omitted, but the principal matter of the present invention may use a methodology like that indicated in PTL 3, for example.

In the exemplary communication sequence illustrated in FIG. 8, there is a case where each station sends transmission sequence unit "time information" as independently stated action frames, and a case where each station includes and sends "time information" in a frame that states typical control information, such as a beacon frame or a probe response frame. Also, although not drawn in FIG. 8, "time information" may be included and sent in other typical frames such as RTS, CTS, DATA, and ACK by multiplexing, etc.

However, with an ad hoc mesh network, since each station sends beacon frames, propagating "time information" via beacon frames and action frames as illustrated in FIG. 8 is considered to be efficient.

Furthermore, with an ad hoc mesh network, a format similar to that illustrated in FIGS. 5 to 7 may be used as the frame format stating "time information".

INDUSTRIAL APPLICABILITY

The foregoing thus describes the present invention in detail and with reference to specific embodiments. However, it is obvious that persons skilled in the art may make adjustments or substitutions to such embodiments within a scope that does not depart from the principal matter of the present invention.

In this specification, an embodiment applied to a new wireless LAN standard such as IEEE 802.11ac attempting to realize very high throughput of 1 Gbps was primarily described, but the principal matter of the present invention is not limited thereto. For example, the present invention may be similarly applied to other wireless LAN systems wherein wireless resources on a spatial axis are shared among a plurality of users, or to various wireless systems other than LAN.

In this specification, the series of sequences in which the learning of antenna coefficients and the transmission of information by space-division multiple access using learned antenna coefficients is conducted between an information source and an information recipient is defined to be a "transmission sequence unit". A typical transmission sequence is a single RTS/CTS handshake as illustrated in FIG. 14, but the principal matter of the present invention is not necessarily limited thereto. Also, in the case of ample TXOPs, etc., reverse direction information transmission from the information recipient (RTS receiving station) to the information source (RTS sending station), or in other words RDG (Reverse Direction Grant), may also be applied. For example, IEEE 802.11n defines an RD protocol in order to further increase the efficiency of data transmission in a TXOP.

In short, the present invention has been disclosed in the form of examples, and the stated content of this specification is not to be interpreted in a limiting manner. The principal matter of the present invention should be determined in conjunction with the claims.

REFERENCE SIGNS LIST 11 antenna
12 signal processor
13 physical layer processor
14 MAC layer processor

The invention claimed is:

1. A communication system consisting of a plurality of stations that conduct space-division multiple access using an array antenna, wherein
when conducting a transmission sequence unit whereby the learning of antenna coefficients and the transmission of information by space-division multiple access using learned antenna coefficients is conducted among a base station and one or more terminals, the base station transmits a first frame that reports, to one or more terminals that are within communication range of the base station, time information related to a transmission sequence unit scheduled on a network, and the one or more terminals that are within communication range of the base station then transmit a second frame for reporting, to one or more terminals that are not within communication range of the base station, time information related to the transmission sequence unit in response to receiving the first frame.

2. The communication system according to claim 1, wherein the terminal sends a third frame that reports, to the base station, time information related to a second transmission sequence unit being scheduled on the network that includes the one or more terminals that are not within communication range of the base station in response to receiving the second frame from the one or more terminals that are not within communication range of the base station.

3. The communication system according to claim 2, wherein the base station, on the basis of time information related to the second transmission sequence unit obtained by decoding the received third frame, adjusts the start time of the transmission sequence unit scheduled on the network so as to not overlap in time with the second transmission sequence unit.

4. The communication system according to claim 2, wherein
the first frame, the second frame, and the third frame are transmitted as management frames.

5. The communication system according to claim 2, wherein
the first frame, the second frame, and the third frame are addressed and transmitted to a broadcast address.

6. The communication system according to claim 1, wherein
the second frame is transmitted as a frame addressed to the base station from the one or more terminals.

7. A communication apparatus, comprising:
a communication unit able to conduct space-division multiple access using an array antenna; and
a controller that controls communication operation by the communication unit;
wherein
when the controller operates as a base station and conducts a transmission sequence unit whereby the learning of antenna coefficients and the transmission of information by space-division multiple access using learned antenna coefficients is conducted with one or more terminals, the controller causes a first frame to be transmitted which reports, to one or more terminals that are within communication range of the base station, time information related to a transmission sequence unit scheduled on a network, and
in response to receiving a third frame from at least one or more terminals that are not within communication range of the base station that reports time information related to a second transmission sequence unit being scheduled on the network including the one or more terminals that are not within communication range of the base station, adjusts the start time of the transmission sequence unit scheduled the network so as to not overlap in time with the second transmission sequence unit.

8. A communication method for conducting space-division multiple access using an array antenna, such that when operating as a base station and conducting a transmission sequence unit whereby the learning of antenna coefficients and the transmission of information by space-division multiple access using learned antenna coefficients is conducted with one or more terminals, the method includes:
a step of transmitting a first frame that reports, to one or more terminals that are within communication range of the base station, time information related to a transmission sequence unit scheduled a network;
a step of receiving a third frame from at least one of the one or more terminals that reports time information related to a second transmission sequence unit that are not within communication range of the base station being scheduled on the network including the one or more terminals that are not within communication range of the base station; and
a step of adjusting the start time of the transmission sequence unit scheduled the network so as to not overlap in time with the second transmission sequence unit, on the basis of time information related to the second transmission sequence unit obtained by decoding the received third frame.

9. A non-transitory computer-readable medium having embodied thereon a program, which when executed by a processor of a communication apparatus causes the communication apparatus to function as
a communication unit able to conduct space-division multiple access using an array antenna, and
a controller that controls communication operation by the communication unit,
wherein when the controller operates as a base station and conducts a transmission sequence unit whereby the learning of antenna coefficients and the transmission of information by space-division multiple access using learned antenna coefficients is conducted with one or more terminals, the controller causes a first frame to be transmitted which reports, to the one or more terminals that are within communication range of the base station, time information related to a transmission sequence unit scheduled on a network, and in response to receiving a third frame from at least one of one or more terminals that are not within communication range of the base station that reports time information related to a second transmission sequence unit being scheduled on the network of the one or more terminals that are not within communication range of the base station, adjusts the start time of the transmission sequence unit scheduled on the network so as to not overlap in time with the second transmission sequence unit.

10. A communication system consisting of a plurality of stations that conduct space-division multiple access using an array antenna, wherein
when conducting a transmission sequence unit whereby the learning of antenna coefficients and the transmission of information by space-division multiple access using learned antenna coefficients is conducted among a plurality of terminals that are within communication range of the base station, the information source station transmits a first frame that reports, to the plurality of terminals that are within communication range given to be information recipients, time information related to a transmission sequence unit scheduled on a network, and one or more terminals given to be information recipients respectively transmit a second frame for reporting, to one or more terminals that are not within communication range, time information related to the transmission sequence unit in response to receiving the first frame.

11. The communication system according to claim 10, wherein
the one or more stations given to be information recipients send a third frame that reports, to the information source station, time information related to a second transmission sequence unit being scheduled on the network of the one or more terminals that are not within communication range in response to receiving the second frame from the one or more terminals that are not within communication range.

12. The communication system according to claim 11, wherein
the information source station, on the basis of time information related to the second transmission sequence unit obtained by decoding the received third frame, adjusts the start time of the transmission sequence unit scheduled on the network so as to not overlap in time with the second transmission sequence unit.

13. The communication system according to claim 11, wherein
the first frame, the second frame, and the third frame are transmitted as management frames.

14. The communication system according to claim 11, wherein
the first frame, the second frame, and the third frame are transmitted as beacon frames or probe response frames.

15. The communication system according to claim 11, wherein
the first frame, the second frame, and the third frame are addressed and transmitted to a broadcast address.

16. The communication system according to claim 10, wherein
the second frame is transmitted as a frame addressed to the information source station from the station given to be an information recipient.

17. A communication apparatus, comprising:
a communication unit able to conduct space-division multiple access using an array antenna; and
a controller that controls communication operation by the communication unit;
wherein
when the controller operates as an information source and conducts a transmission sequence unit whereby the learning of antenna coefficients and the transmission of information by space-division multiple access using learned antenna coefficients is conducted with one or more terminals given to be information recipients that are within communication range, the controller causes a first frame to be transmitted which reports, to the one or more terminals given to be information recipients that are within communication range, time information related to a transmission sequence unit scheduled on a network, and in response to receiving a third frame from at least one of the one or more terminals given to be information recipients that are within communication range that reports time information related to a second transmission sequence unit being scheduled on the network that includes one or more terminals that are not within communication range of the base station, adjusts the start time of the transmission sequence unit scheduled on the network so as to not overlap in time with the second transmission sequence unit.

18. A communication method for conducting space-division multiple access using an array antenna, such that when operating as an information source and conducting a transmission sequence unit whereby the learning of antenna coefficients and the transmission of information by space-division multiple access using learned antenna coefficients is conducted with one or more stations given to be information recipients, the method includes:
a step of transmitting a first frame that reports, to the one or more terminals given to be information recipients within communication range, time information related to a transmission sequence unit scheduled on a network;
a step of receiving a third frame from at least one of the one or more stations given to be information recipients within communication range that reports time information related to a second transmission sequence unit being scheduled on the network that includes one or more terminals that are not within communication range; and
a step of adjusting the start time of the transmission sequence unit scheduled on the network so as to not overlap in time with the second transmission sequence unit, on the basis of time information related to the second transmission sequence unit obtained by decoding the received third frame.

19. A non-transitory computer-readable medium having embodied thereon a program, which when executed by a processor of a communication apparatus causes the communication apparatus to function as
a communication unit able to conduct space-division multiple access using an array antenna, and
a controller that controls communication operation by the communication unit,
wherein
when the controller operates as an information source and conducts a transmission sequence unit whereby the learning of antenna coefficients and the transmission of information by space-division multiple access using learned antenna coefficients is conducted with one or more stations given to be information recipients that are within communication range, the controller causes a first frame to be transmitted which reports, to the one or more terminals given to be information recipients that are within communication range, time information related to a transmission sequence unit scheduled on a network, and in response to receiving a third frame from at least one of the one or more terminals given to be information recipients that are within communication range that reports time information related to a second transmission sequence unit being scheduled on the network including one or more terminals that are not within communication range of the communication apparatus, adjusts the start time of the transmission sequence unit scheduled on the network so as to not overlap in time with the second transmission sequence unit.

* * * * *